Figure 1:
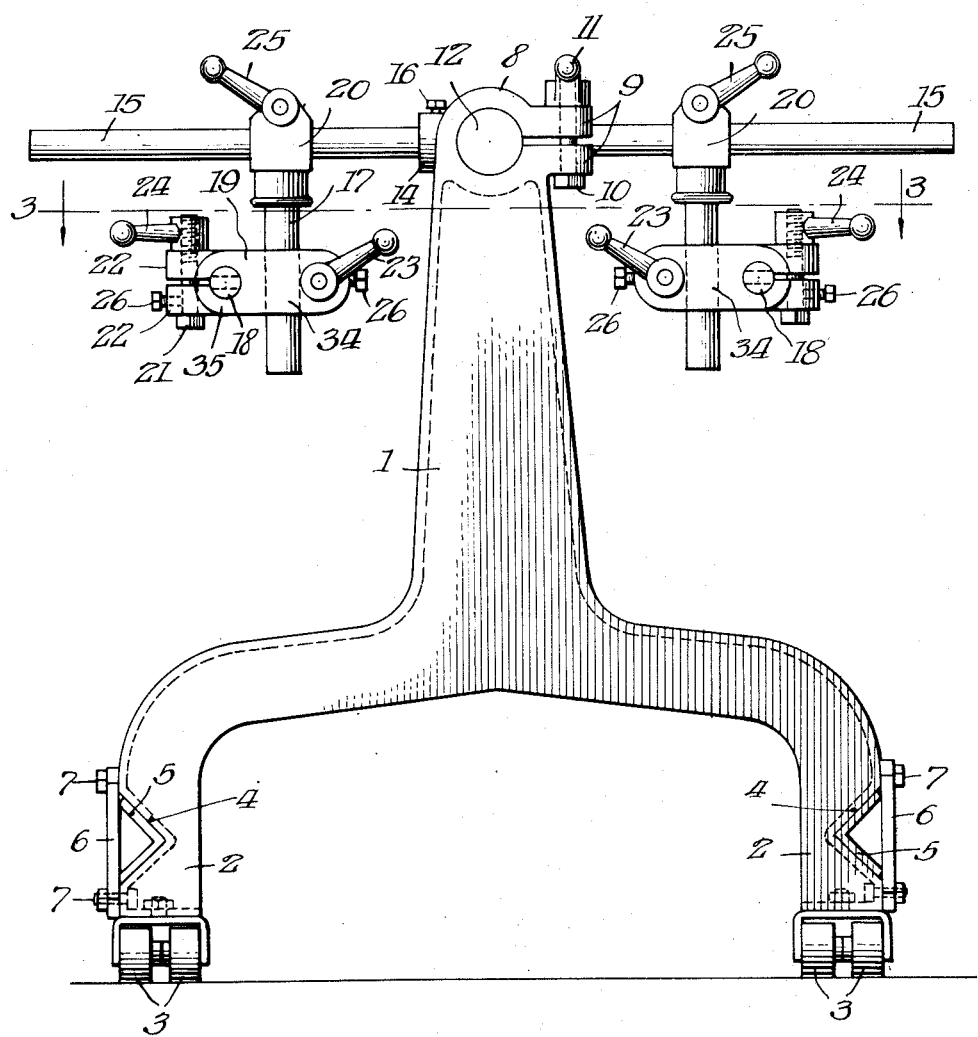

March 11, 1924.

F. L. COLE

MOTOR STAND

Filed Nov. 10, 1921

1,486,481

3 Sheets-Sheet 1

Inventor:
Frank L. Cole,
By Fisher, Fowle, Clapp & Soans
attys

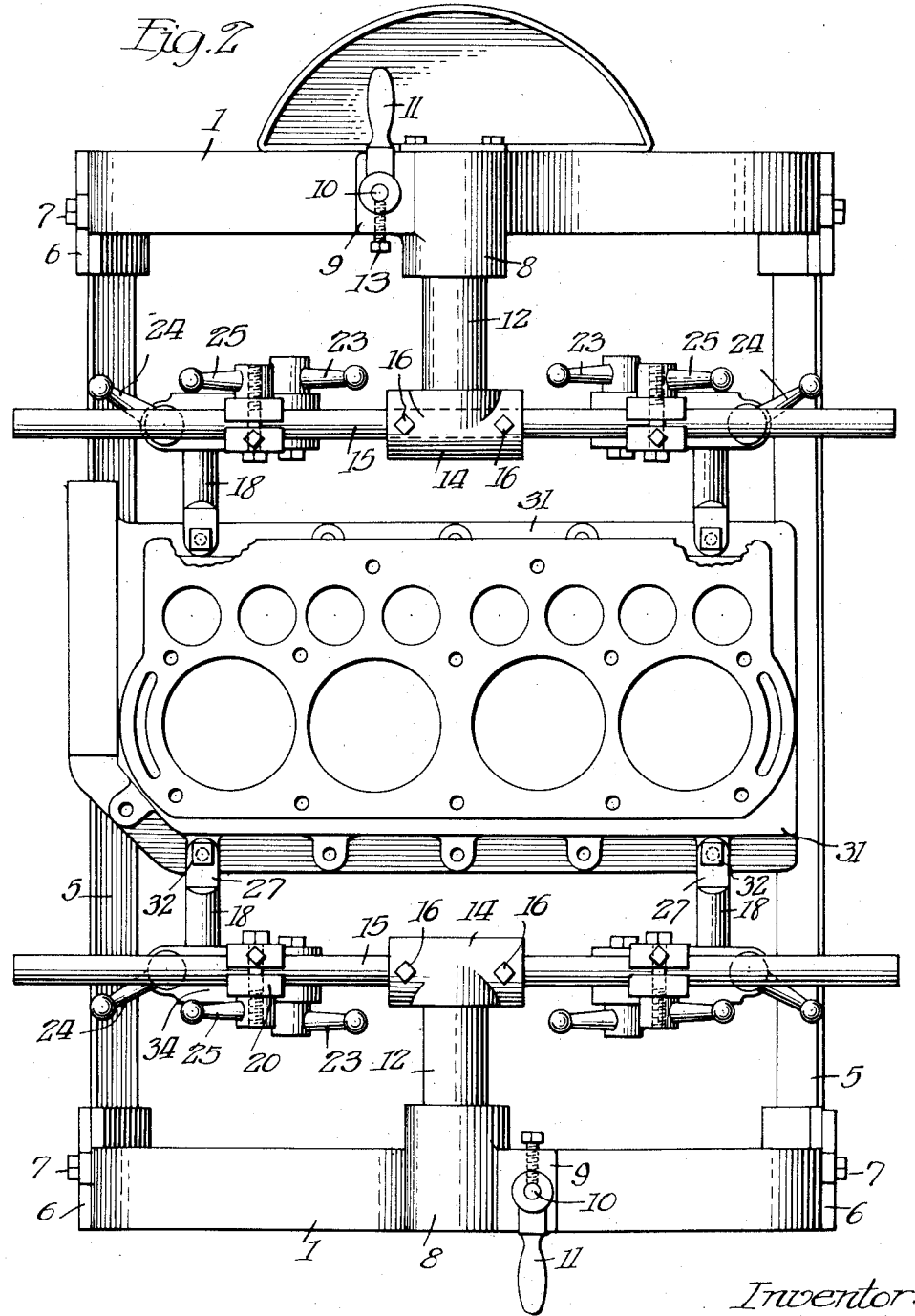

March 11, 1924.
F. L. COLE
1,486,481
MOTOR STAND
Filed Nov. 10, 1921   3 Sheets-Sheet 3
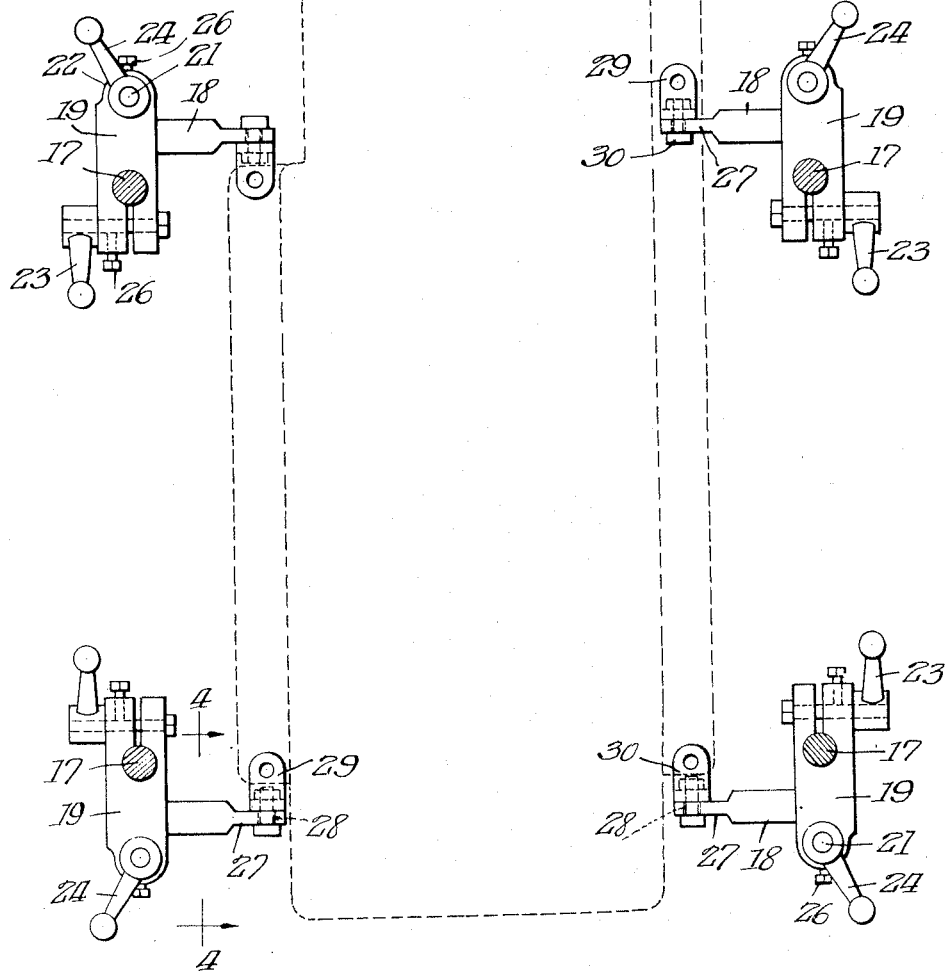
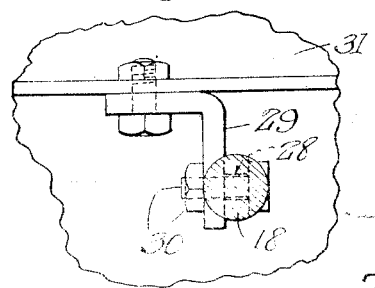
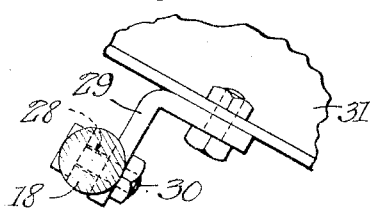
Inventor:
Frank L. Cole,
by Fisher, Fowle, Clapp & Soans
Attys.

Patented Mar. 11, 1924.

1,486,481

UNITED STATES PATENT OFFICE.

FRANK LEROY COLE, OF CHICAGO HEIGHTS, ILLINOIS, ASSIGNOR TO CANEDY-OTTO MFG. CO., OF CHICAGO HEIGHTS, ILLINOIS, A CORPORATION OF ILLINOIS.

MOTOR STAND.

Application filed November 10, 1921. Serial No. 514,182.

*To all whom it may concern:*

Be it known that I, FRANK LEROY COLE, a citizen of the United States, residing at Chicago Heights, in the county of Cook and State of Illinois, have invented certain new and useful Improvements in Motor Stands, of which the following is a specification.

My invention has reference more particularly to a frame for supporting internal combustion engines or motors so that work may be conveniently performed thereon.

In working on automobile motors and the like, it is desirable to support same so that access may be readily had to the various parts thereof, this being accomplished in practice by using a supporting frame which has brackets or carrying parts, to which the motor is secured, which are pivotally adjustable so that the motor may be swung to various positions. Motors are constructed in a great variety of sizes and forms and a device of this character is not satisfactory for ordinary garage use unless it is readily adaptable to support motors of the various makes and sizes.

The principal objects of my invention are to provide an improved motor stand, which is adapted to support motors of substantially all sizes and makes; to avoid the necessity of special attachments for different motors; to afford a wide range of adjustment of the attaching devices so that they will fit any motor; to simplify the construction so that the necessary adjustments may be conveniently effected; to afford convenient means for adjusting the motor after it is mounted on the supporting frame, to locate the center of gravity so as to facilitate pivotal adjustment of the motor; and in general, to provide a work stand for motors, which is simple, inexpensive, and more convenient than heretofore provided.

On the drawings:

Fig. 1 is a side view of my motor stand;

Fig. 2, a top view thereof with a motor mounted thereon;

Fig. 3, a view in section on the line 3—3 of Fig. 1;

Fig. 4, an enlarged detail view on the line 4—4 of Fig. 3, and

Fig. 5, a view similar to Fig. 4 showing the adjustment of the parts for angular connection.

Referring to the drawings, the reference numerals 1—1 indicate a pair of similar spaced standards, each of which has widely spaced leg portions 2 at the lower ends with caster wheels 3 secured thereon and V-shaped recesses 4 in the outer faces. An angle iron 5 extends between corresponding legs of the two standards 1—1 and has the ends secured in the V-shaped recesses 4 of said legs by a clamp plate 6, which is fastened to the outer face of the leg portion 2 by bolts 7 in such a manner as to engage the outer edges of the flanges of the angle iron 5 and clamp the latter in the V-shaped recess 4.

At the upper end of each standard 1 is a split bearing 8 having a pair of laterally projecting lugs 9 through which a bolt 10 is passed and this bolt has a tail nut 11 threaded thereon and operable to contract the bearing 8 for clamping the large shaft 12 therein. The lower lug 9 of each bearing 8 is preferably provided with a laterally extending set screw 13, which may be turned down against the bolt 10 so as to hold the latter against turning when the tail nut 11 is operated, and this arrangement permits adjustment of the bolt 10 so that the necessary range of movement of the hand lever 11 is at a convenient point.

Each of the shafts 12 has a fitting 14 fixed on the inner end and provided with an opening therethrough at right angles to the axis of the shaft 12 and a shaft 15 is inserted through said opening and secured in place by set screws 16, so as to project similarly beyond each end of the sleeve. These shafts 15 serve as side supporting rails for the motor and each has attaching devices mounted thereon at opposite sides of the sleeve 14 and adjustable so as to accommodate substantially any make of motor. Each of these attaching devices comprises a pair of shafts 17 and 18, which are held in positions at right angles to one another by the connector 19 and are adjustably mounted on the shaft 15 by the clamp 20 on the end of the shaft 17, which engages said shaft 15. The connector 19 has the clamp members 34 and 35 at the opposite ends thereof which engage the shafts 17 and 18 respectively and these clamp members as well as the clamp member 20 each comprises a split bearing embracing the respective shaft and having extension lugs 22 with a bolt 21 extending therethrough, each of said bolts being engaged by a set screw 26, which is threaded through one of the lugs 22 so as to engage the bolt 21 and hold the latter against turning. These clamps 34, 35 and 20 have the tail nuts 23, 24 and 25 respectively engaging the bolts 21 thereof for adjusting the clamps.

The outer end of each shaft 18 is flattened as indicated at 27 and provided with a bolt hole 28 for attachment direct to a motor or to receive an angle bracket 29, which is secured onto the flat end 27 of the shaft 18 by a bolt 30 and may be swung to various positions to afford a connection with angular portions of the motor.

To mount a motor on this stand, the side rails 15 are adjusted to substantially the required spaced relation by releasing the clamp levers 11 and adjusting the shafts 12 axially in their bearings. The motor, which I have indicated at 31, is then placed between the rails 15 and the shafts 18 adjusted by releasing the clamps 23, 24 and 25 and effecting the necessary relative sliding or turning movements of the shafts and clamps so as to position the flat end 27 of each shaft 18 to register with a bolt hole in a supporting part of the motor. The clamps are then tightened up and a bolt 32 engaged through the aperture 28, and the supporting part of the motor thus securing the motor on the stand. The flat ends 27 of the shafts 18 will serve to effect the desired connection in nearly all cases, as the shafts 18 may be turned in the clamps 35 to position the flat surface of the end 27 at an angle to a horizontal plane and moreover, the shaft 18 may be swung angularly in a horizontal plane by releasing the clamp 34, which engages the shaft 17, and may also be swung in a vertical plane by releasing the clamp 20, which engages the shaft 15. If, however, any connection is required which cannot be conveniently effected by the flat end 27, the angle bracket 29 may be secured to the flat end 27 by the bolt 30, which permits adjustment of the bracket around the pivotal axis of the bolt and together with the adjustments hereinbefore mentioned, of which the flat end 27 is capable, renders it possible to make the required attachment with almost any conceivable supporting part of the motor.

The principal advantage of this machine, as will be readily observed, is in the extreme range of adjustment which enables the device to be adapted, as far as applicant is aware, to any make of motor without the necessity of special attachments, except perhaps in a few cases the angle brackets 29. The side rails are adjustable as a whole axially of the shafts 12 and also circularly around the axis of these shafts and the shaft 18 to which the motor is connected is not only adjustable axially and circularly in its clamp 35 by manipulating the tail nut 24, but may be adjusted longitudinally of the shaft 17 or circularly therearound by manipulating the tail nut 23 and moreover, may be adjusted longitudinally of the shaft 15 and circularly therearound by releasing the tail nut 25, thus affording any possible adjustment that may be required. The clamps 19 may be adjusted on the shafts 17 to bring the center of gravity of the supported motor near to the axis of the shafts 12 and the clamps 20 may be adjusted on the shafts 15 or the shafts 15 adjusted in the sleeves 14 to bring the center of gravity of the motor sufficiently near to the axis of the shafts 12 so that the motor may be easily swung in the motor frame in the bearings 8 to any position that may be required to afford access thereto.

While I have shown and described my invention in a preferred form, I am aware that various changes and modifications may be made without departing from the principles of my invention, the scope of which is to be determined by the appended claims.

I claim as my invention:

1. In a motor stand, the combination of a frame having a pair of spaced side rails independently pivoted thereon on aligning axes perpendicular to said rails, and means on said rails adjustable circularly therearound and to and from the pivotal axes of said rails and adapted to be connected with a motor.

2. In a motor stand, the combination of a frame having a pair of laterally spaced side rails pivoted thereon on aligning axes perpendicular to the rails, and motor supporting means on the rails adjustable longitudinally of, circularly around and radially from the rails.

3. In a motor stand, the combination of a frame having a pair of laterally spaced side rails pivoted on aligning axes perpendicular to the rails, and motor supporting means on the rails comprising an arm extending laterally from the rail, another arm disposed at an angle to the first mentioned arm and a clamping member slidable on the first mentioned arm and adjustable circularly therearound and having the other arm slidably and rotatably adjustable thereon.

4. In a motor stand, the combination of a frame having a pair of laterally spaced rails pivoted on aligning axes perpendicular to the rails, a clamp slidable longitudinally of and circularly around each rail and having a stem, a clamp slidable longitudinally on and circularly around the stem and an arm slidable longitudinally and rotatable in the clamp.

5. In a motor stand, the combination of a frame having a pair of spaced side rails of circular cross section, each independently pivoted on the frame on aligning axes, a stem having a clamp at the end engaging the side rail, a clamp on the stem and an arm adjustably mounted on the clamp and having means for connection with a motor.

6. In a motor stand, the combination of a pair of spaced standards each having a clamp at the upper end, a shaft axially slidable and circularly adjustable in each clamp, a rail mounted on each shaft at right angles to the pivotal axis thereof and longitudinally adjustable thereon and adjustable members on the rails adapted to be connected with a motor.

7. In a motor stand, the combination of a pair of spaced standards each having corresponding spaced leg portions with a corresponding V-shaped recess in each leg portion, an angle iron extending between the corresponding leg portions of the standards and seated in the V-shaped recesses thereof so that the edges of the angle iron flanges project at the outer extremities of the recess and a clamp plate on each leg portion adapted to engage the outer edges of the flanges of the angle iron to clamp the latter in the V-shaped recess and hold the standards in spaced relation.

FRANK LEROY COLE.